US012160716B2

(12) United States Patent
Konno et al.

(10) Patent No.: US 12,160,716 B2
(45) Date of Patent: Dec. 3, 2024

(54) LOUDSPEAKER SYSTEM, MOBILE BODY SEAT, AND MOBILE BODY

(71) Applicant: Panasonic Intellectual Property Management Co., Ltd., Osaka (JP)

(72) Inventors: Fumiyasu Konno, Osaka (JP); Masahide Onishi, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 170 days.

(21) Appl. No.: 17/872,673

(22) Filed: Jul. 25, 2022

(65) Prior Publication Data

US 2023/0036803 A1 Feb. 2, 2023

(30) Foreign Application Priority Data

Jul. 30, 2021 (JP) ................................ 2021-125793

(51) Int. Cl.
*H04R 5/02* (2006.01)
*H04R 1/02* (2006.01)

(52) U.S. Cl.
CPC ............ *H04R 5/023* (2013.01); *H04R 1/025* (2013.01); *H04R 2201/028* (2013.01)

(58) Field of Classification Search
CPC ... H04R 5/023; H04R 1/025; H04R 2201/028
See application file for complete search history.

(56) References Cited

U.S. PATENT DOCUMENTS

2001/0052153 A1* 12/2001 Schwartz ............... A47C 7/725 362/127
2007/0086612 A1 4/2007 Nishibori et al.
2017/0072869 A1* 3/2017 Ito .......................... H04R 5/023
2018/0295443 A1* 10/2018 Takada ..................... A47C 7/38
2020/0134964 A1* 4/2020 Achmueller ........ G07F 17/3216
2020/0236461 A1* 7/2020 Hall ....................... A63G 31/16

FOREIGN PATENT DOCUMENTS

JP 4907991 4/2012

* cited by examiner

*Primary Examiner* — Suhan Ni
(74) *Attorney, Agent, or Firm* — GREENBLUM & BERNSTEIN, P.L.C.

(57) ABSTRACT

A loudspeaker system includes: a first cushion body near which a head of a person is to be located when the person is seated or recumbent; and a first loudspeaker that is provided to the first cushion body and outputs ultrasound toward the head.

13 Claims, 13 Drawing Sheets

LOUDSPEAKER SYSTEM, MOBILE BODY SEAT, AND MOBILE BODY

CROSS REFERENCE TO RELATED APPLICATION

The present application is based on and claims priority of Japanese Patent Application No. 2021-125793 filed on Jul. 30, 2021.

FIELD

The present disclosure relates to a loudspeaker system, a mobile body seat, and a mobile body.

BACKGROUND

Patent Literature (PTL) 1 discloses a cushion that includes a loudspeaker.

CITATION LIST

Patent Literature

PTL 1: Japanese Patent No. 4907991

SUMMARY

However, the cushion including a loudspeaker according to PTL 1 can be improved upon.

In view of this, the present disclosure provides a loudspeaker system capable of improving upon the above related art.

In accordance with an aspect of the present disclosure, a loudspeaker system includes: a first cushion body near which a head of a person is to be located when the person is seated or recumbent; and a first loudspeaker that is provided to the first cushion body and outputs ultrasound toward the head.

In accordance with another aspect of the present disclosure, a mobile body seat includes the loudspeaker system described above.

In accordance with still another aspect of the present disclosure, a mobile body includes the mobile body seat described above.

A loudspeaker system according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
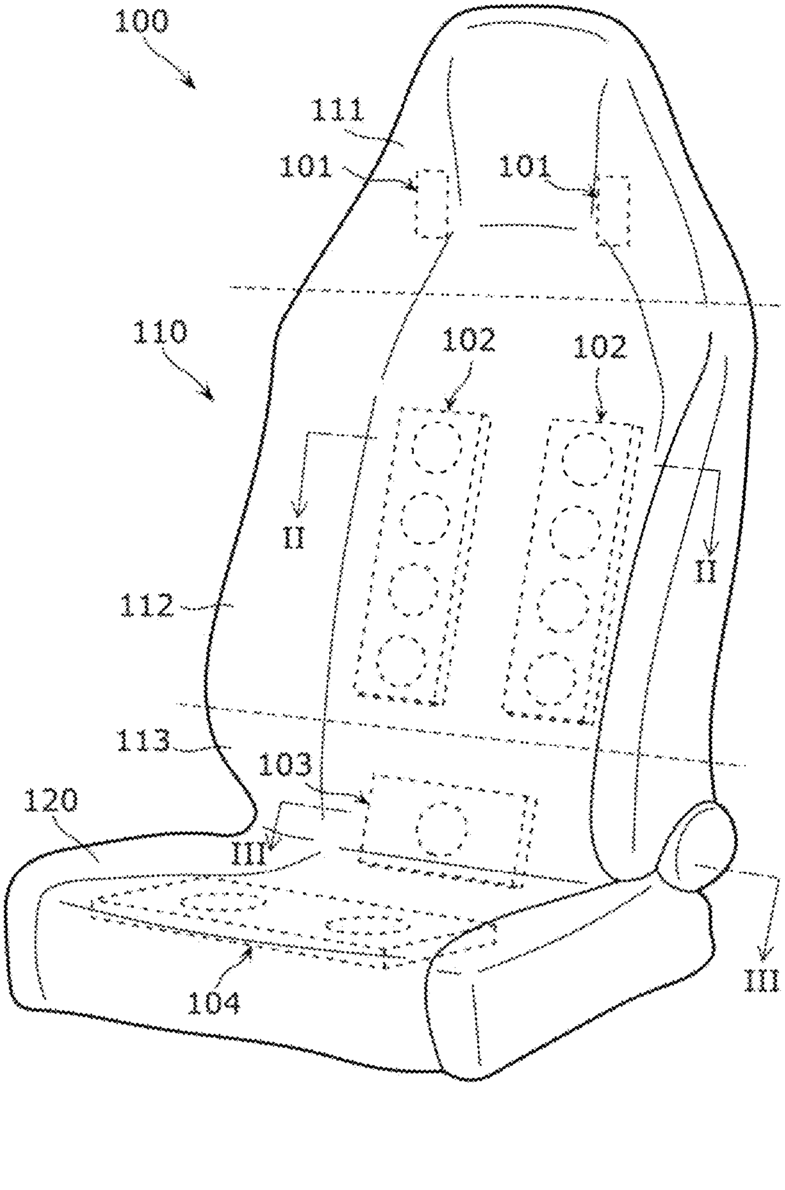
FIG. 1 is an external view of a seat that includes a loudspeaker system according to Embodiment.

With the conventional technology according to PTL 1, it is difficult to effectively improve a bloodstream of a person.

The present inventors have found that a bloodstream of a person can be effectively improved by ultrasound outputted toward a head of the person.

In accordance with an aspect of the present disclosure, a loudspeaker system includes: a first cushion body near which a head of a person is to be located when the person is seated or recumbent; and a first loudspeaker that is provided to the first cushion body and outputs ultrasound toward the head.

This allows the ultrasound to be outputted toward the head of the person and can thereby effectively improve the bloodstream of the person.

For example, the loudspeaker system may further include: a second cushion body that comes in contact with a back of the person when the person is seated or recumbent; and a second loudspeaker that is provided to the second cushion body and outputs sound toward the back.

This further allows the sound to be outputted toward the back of the person and can thereby more effectively improve the bloodstream of the person.

For example, the second loudspeaker may include a group of loudspeakers that are aligned along a spine of the person.

This allows the sound to be outputted along the spine of the person and can thereby more effectively improve the bloodstream of the person.

For example, the loudspeaker system may further include: a third cushion body that comes in contact with at least one of a waist, a hip, and a thigh of the person when the person is seated or recumbent; and an actuator that is provided to the third cushion body and outputs low-frequency vibrations toward the at least one of the waist, the hip, and the thigh.

This allows the low-frequency vibrations to be outputted toward at least one of the waist, the hip, and the thigh of the person, and can thereby more effectively improve the bloodstream of the person.

For example, the loudspeaker system may further include: a second cushion body that comes in contact with a back of the person when the person is seated or recumbent; a third cushion body that comes in contact with at least one of a waist, a hip, and a thigh of the person when the person is seated or recumbent; a second loudspeaker that is provided to the second cushion body and outputs sound toward the back; an actuator that is provided to the third cushion body and outputs low-frequency vibrations toward the at least one of the waist, the hip, and the thigh; and a signal generator that generates an ultrasound signal for the ultrasound, an audio signal for the sound, and a low-frequency signal for the low-frequency vibrations, on the basis of sound source data.

With this, the ultrasound signal for the ultrasound, the audio signal for the sound, and the low-frequency signal for the low-frequency vibrations are generated from the same sound source data. Thus, characteristics, such as high/low levels, of the ultrasound, the sound, and the low-frequency vibrations can match with each other. This thereby enables emission of the ultrasound, the sound, and the low-frequency vibrations that comfort the person. For example, the loudspeaker system may further include: a first amplifier that causes the first loudspeaker to output the ultrasound based on the ultrasound signal; a second amplifier that causes the second loudspeaker to output the sound based on the audio signal; and a third amplifier that causes the actuator to output the low-frequency vibrations based on the low-frequency signal.

With this, the ultrasound signal for the ultrasound, the audio signal for the sound, and the low-frequency signal for the low-frequency vibrations obtained from the same sound source data are outputted to the first loudspeaker, the second loudspeaker, and the actuators, respectively. Thus, the ultrasound, the sound, and the low-frequency vibrations having similar characteristics can be outputted. This thereby enables emission of the ultrasound, the sound, and the low-frequency vibrations that comfort the person.

For example, it is possible that the signal generator generates a pseudo moving sound corresponding to a moving state of a mobile body as the sound based on the sound source data.

This output of the pseudo moving sound can effectively improve a bloodstream of a person who is riding in the mobile body.

In accordance with another aspect of the present disclosure, A mobile body seat includes the loudspeaker system described above.

This allows the ultrasound to be outputted toward the head of the person who is riding in the mobile body, and can thereby effectively improve the bloodstream of the person.

In accordance with still another aspect of the present disclosure, a mobile body includes the mobile body seat described above.

This allows the ultrasound to be outputted toward the head of the person who is riding in the mobile body, and can thereby effectively improve the bloodstream of the person.

Hereinafter, the loudspeaker system, mobile body seat, and mobile body according to an aspect of the present disclosure will be described in detail with reference to the drawings.

The following embodiments are specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Embodiment

The following describes a configuration of a loudspeaker system according to Embodiment.

[1. Configuration]

FIG. 1 is an external view of a seat that includes a loudspeaker system according to Embodiment.

As illustrated in FIG. 1, loudspeaker system 100 includes backrest 110 and seating surface 120. Loudspeaker system 100 is a seat (seat) that includes first loudspeaker 101, second loudspeaker 102, and actuators 103 and 104 that are disposed inside backrest 110 and seating surface 120.

Loudspeaker system 100 is a seat to be placed in a vehicle, such as a car, an aircraft, or a ship. Note that loudspeaker system 100 is not limited to a seat for indoor use in a vehicle. Loudspeaker system 100 may be a seat to be placed in a movie theater, a stage theater, or a conference room. Alternatively, loudspeaker system 100 may be a seat including a cushion, a legless chair, a sofa, or a massage chair.

Backrest 110 supports a head or back of a person when the person is seated in loudspeaker system 100. Backrest 110 includes: first section 111 that supports the head of the person; second section 112 that supports an upper portion of the back of the person; and third section that supports a lower portion, including a waist, of the back of the person. Seating surface 120 supports thighs of the person when the person is seated in loudspeaker system 100. First section 111 is an example of a first cushion body near which the head of the person is to be located when the person is seated. Note that first section 111 is positioned to come in contactable with the head of the person when the person moves the head backward while seated. More specifically, first section 111 is positioned behind the head of the person in a region where the head of the person comes in contactable with first section 111 when the person is seated. Second section 112 is an example of a second cushion body that comes in contact with the back of the person when the person is seated. Third section 113 and seating surface 120 are an example of a third cushion body that comes in contact with at least one of a waist, a hip, and a thigh when the person is seated.

First loudspeaker 101 is provided to first section 111, and is a tweeter that outputs ultrasound toward the head of the person. For example, first loudspeaker 101 emits sound (ultrasound) in a frequency band from 20 kHz to 100 kHz.

Second loudspeaker 102 is provided to second section 112 and outputs sound toward the back of the person. More specifically, second loudspeaker 102 includes a group of loudspeakers that are aligned along a spine of the person. For example, second loudspeaker 102 is two rows of line array loudspeakers as a plurality of loudspeakers aligned along the spine of the person. Note that second loudspeaker 102 is not limited to the two rows of line array loudspeakers. Second loudspeaker 102 may be one row of line array loudspeakers, a single loudspeaker, or a plurality of loudspeakers. Second loudspeaker 102 emits sound in a frequency band from 90 Hz to 20 kHz.

Actuator 103 is provided to third section 113 and outputs low-frequency vibrations toward the waist and hip of the person. For example, actuator 103 emits sound (low-frequency vibrations) in a frequency band from 40 Hz to 90 Hz.

Actuator 104 is provided to seating surface 120 and outputs low-frequency vibrations toward the hip and thigh of the person. For example, actuator 104 emits sound (low-frequency vibrations) in a frequency band from 40 Hz to 90 Hz.

In the following description, a front-rear direction of loudspeaker system 100 (that is, the seat) is referred to as an X-axis direction, a horizontal direction of loudspeaker system 100 is referred to as a Y-axis direction, and a vertical direction of loudspeaker system 100 is referred to as a Z-axis direction. Moreover, a front side in the front-rear direction is referred to as a positive side in the X-axis direction, a rear side in the front-rear direction is referred to as a negative side in the X-axis direction. A left side in the horizontal direction is referred to as a positive side in the Y-axis direction, and a right side in the horizontal direction is referred to as a negative side in the Y-axis direction. An upper side in the vertical direction is referred to as a positive side in the Z-axis direction, and a lower side in the vertical direction is referred to as a negative side in the Z-axis direction.

In the following description, each of the aforementioned directions refers to a corresponding direction of loudspeaker system 100 when backrest 110 is in its upright position along the Z-axis direction without leaning backward in a reclined position.

In the present disclosure, the front side of the loudspeaker refers to the side where a diaphragm of this loudspeaker is located, and the rear side of the loudspeaker refers to the side where a magnetic circuit of this loudspeaker is located. More specifically, a front direction of the loudspeaker refers to a direction from the magnetic circuit to the diaphragm of the loudspeaker, and a rear direction of the loudspeaker refers to a direction from the diaphragm to the magnetic circuit.

Next, a specific configuration of loudspeaker system 100 is described.

Figure 2:
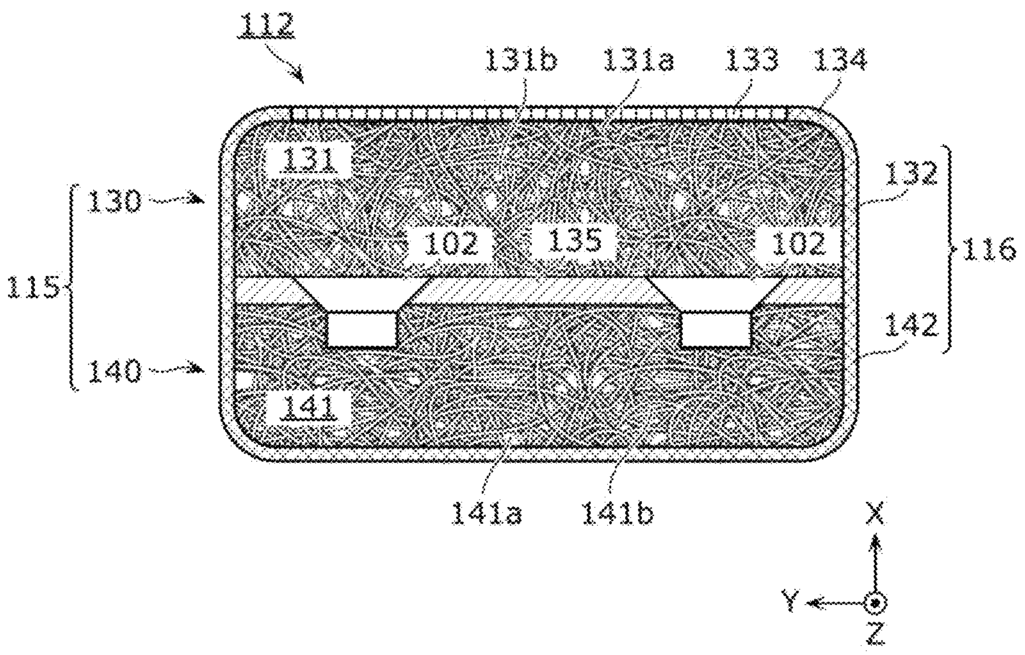
FIG. 2 is a cross-section view of a second section of a backrest of the loudspeaker system along line II-II illustrated in FIG. 1.

FIG. 2 is a cross-section view of the second section of the backrest of the loudspeaker system along line II-II illustrated in FIG. 1.

As illustrated in FIG. 2, second section 112 of backrest 110 in loudspeaker system 100 includes cushion body 115 and two second loudspeakers 102. Loudspeaker system 100 may further include baffle board 135.

Cushion body 115 is a member that is included in second section 112 and that comes in contact with the person when the person is seated. Cushion body 115 includes three-dimensional net-like elastic bodies 131 and 141 and covering material 116.

Each of three-dimensional net-like elastic bodies 131 and 141 is formed of fibers entangled three-dimensionally, and is a member that supports a load of the person. Each of three-dimensional net-like elastic bodies 131 and 141 has a loop shape formed by winding a continuous linear body. Each of three-dimensional net-like elastic bodies 131 and 141 does not have recesses or projections on the surface. Three-dimensional net-like elastic body 131 includes elastic body section 131*a* and air section 131*b*, and three-dimensional net-like elastic body 141 includes elastic body section 141*a* and air section 141*b*. A volume of each of air sections 131*b* and 141*b* occupies 90% or more of a volume of the corresponding one of three-dimensional net-like elastic bodies 131 and 141. More specifically, a volume of each of elastic body sections 131*a* and 141*a* occupies less than 10% of a space occupied by the corresponding one of three-dimensional net-like elastic bodies 131 and 141. Each of three-dimensional net-like elastic bodies 131 and 141 is made of a thermoplastic elastic resin, or more specifically, a polyester or polyethylene material. To be more specific, each of three-dimensional net-like elastic bodies 131 and 141 is made of a polyester elastomer, a polyamide elastomer, a polyurethane elastomer, or a polyolefin elastomer, for example.

Covering material 116 is a member that covers each of outer surfaces of three-dimensional net-like elastic bodies 131 and 141. More specifically, covering material 116 forms a space, which is filled with three-dimensional net-like elastic bodies 131 and 141. In other words, a space occupied by three-dimensional net-like elastic bodies 131 and 141 corresponds to a space covered by covering material 116.

Front sides of two second loudspeakers 102 are covered by cushion body 115. Two second loudspeakers 102 are oriented to emit the sound to the positive side in the X-axis direction of a headrest. Two second loudspeakers 102 are full-range loudspeakers, for example.

Baffle board 135 is a rectangular board member that is accommodated in cushion body 115. Two second loudspeakers 102 are fixed to baffle board 135. Baffle board 135 has two openings in size corresponding to two second loudspeakers 102. Two second loudspeakers 102 are fixed to baffle board 135 so that front surfaces of two second loudspeakers 102 are exposed from the two openings. Baffle board 135 is positioned to divide cushion body 115 in the X-axis direction, and corresponds in size to a width of cushion body 115 in the Z-axis direction and a width of cushion body 115 in the Y-axis direction. For example, baffle board 135 is made of wood, resin, or metal.

Moreover, cushion body 115 includes first cushion section 130 and second cushion section 140 that are positioned in front of and behind the headrest, respectively. First cushion section 130 of cushion body 115 is positioned on the positive side in the X-axis direction of the headrest. To be more specific, first cushion section 130 is located further upstream on the positive side in the X-axis direction with respect to baffle board 135. Second cushion section 140 of cushion body 115 is positioned on the negative side in the X-axis direction of the headrest. To be more specific, second cushion section 140 is located further downstream on the negative side in the X-axis direction with respect to baffle board 135.

First cushion section 130 includes first three-dimensional net-like elastic body 131 and first covering section 132. First three-dimensional net-like elastic body 131 is a part of the three-dimensional net-like elastic body of cushion body 115, and covers the front of two section loudspeakers 102. First covering section 132 covers first three-dimensional net-like elastic body 131. First covering section 132 of covering material 116 covers an upstream part on the positive side in the X-axis direction with respect to baffle board 135.

Second cushion section 140 includes second three-dimensional net-like elastic body 141 and second covering section 142. Second three-dimensional net-like elastic body 141 is a remaining part, apart from first three-dimensional net-like elastic body 131, of the three-dimensional net-like elastic body of cushion body 115. Second three-dimensional net-like elastic body 141 covers the back of two section loudspeakers 102. Section covering section 142 and baffle board 135 together cover second three-dimensional net-like elastic body 141. Second covering section 142 of covering material 116 covers a downstream part on the negative side in the X-axis direction with respect to baffle board 135.

Furthermore, covering material 116 includes: first covering material 133 that covers a part, out of peripheries of three-dimensional net-like elastic bodies 131 and 141, corresponding to the front of two second loudspeakers 102; and second covering material 134 that covers the remaining part apart from first component material 133. In the present embodiment, first covering section 132 includes first covering material 133 and second covering material 134, and second covering section 142 includes only second covering material 134. First covering material 133 is made from a material higher in sound transmission than second covering material 134. First covering material 133 may be made from a breathable material, and second covering material 134 may be made from an airtight material. First covering material 133 is made using one piece of material in size to include two second loudspeakers 102 when viewed from the X-axis direction. However, this is not intended to be limiting. First covering material 133 may be made using two pieces of material to separately include two second loudspeakers 102.

As described above, the back of two loudspeakers 102 are covered by second three-dimensional net-like elastic body 141 that is covered by baffle board 135 and second covering section 142.

Moreover, second covering section 142 includes second covering material 134. Thus, an enclosed space covered by baffle board 135 and second covering material 134 is formed behind two second loudspeakers 102. This enclosed space can function as an enclosure. In this way, the space inside second cushion section 140 functioning as a cushion material can also function as the enclosure. This allows a capacity of an internal space of the headrest to be used efficiently. Thus, the stiffness of a gaseous matter inside the enclosed space in second cushion section 140 can be reduced. This can thereby reduce cancellation of sound in a low frequency range. As a result, sound having excellent sound pressure frequency characteristics can be emitted forward.

Furthermore, second covering material 134 may include an acoustic absorbent. More specifically, the acoustic absorbent may be disposed inside second covering material 134, and a sheet-like covering material is disposed outside second covering material 134. Thus, second covering material 134 may be formed of a material having at least two layers. For second covering material 134 formed of the material having two layers, the acoustic absorbent is interposed between the covering material and two second loudspeakers 102. The acoustic absorbent may be formed of glass wool or felt. Alternatively, the acoustic absorbent may be formed of a urethane foam material or a urethane sponge. Here, the sheet-like covering material is fabric like a cloth, or leather or faux leather, for example. Second covering material 134 including the acoustic absorbent can effectively reduce a standing wave.

Note that second covering material 134 may not be formed of the material having at least two layers, and may be formed of a material having a single layer.

Moreover, second covering material 134 may be airtight.

Here, first cushion section 130 located in front of section loudspeakers 102 includes first three-dimensional net-like elastic body 131 and second covering section 132. However, first three-dimensional net-like elastic body 131 may not be included. A cushion made of a foam member, such as urethane, that includes a through-hole to pass sound from second loudspeakers 102 through may be disposed instead. In this way, a material that is high in breathability and in sound transmission may be disposed in front of second loudspeakers 102.

Moreover, second cushion section 140 is disposed behind second loudspeakers 102. However, this is not intended to be limiting. A supporting member that supports at least one of second loudspeakers 102 and baffle board 135 may be disposed. The supporting member may be a box-like member that covers the back of second loudspeakers 102 and baffle board 135. More specifically, the supporting member may be disposed so that a space between the supporting member and each of second loudspeakers 102 and baffle board 135 functions as an enclosure.

Note that first loudspeaker 101 may be provided to first section 111 in a manner similar to second loudspeaker 102. Alternatively, first loudspeaker 101 may be provided to first section 111 to be exposed from first section 111.

Figure 3:
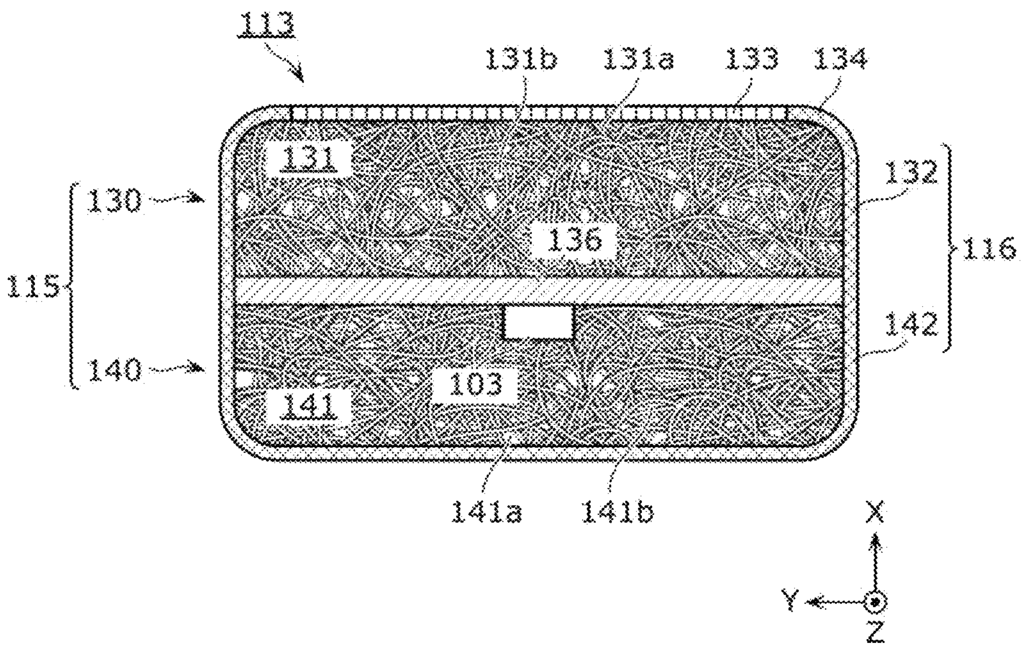
FIG. 3 is a cross-section view of a third section of the backrest of the loudspeaker system along line III-III illustrated in FIG. 1.

FIG. 3 is a cross-section view of the third section of the backrest of the loudspeaker system along line III-III illustrated in FIG. 1.

As illustrated in FIG. 3, third section 113 of backrest 110 in loudspeaker system 100 includes cushion body 115, actuator 103, and diaphragm 136. Third section 113 is different from second section 112 in that actuator 103 and diaphragm 136 are included instead of two second loudspeakers 102 and baffle board 135. The following describes this difference.

Actuator 103 is fixed to diaphragm 136. Actuator 103 includes a coil and a magnetic circuit. The coil is fixed to diaphragm 136. The coil of actuator 103 moves relative to the magnetic circuit, which results in vibrations of diaphragm 136. Note that the magnetic circuit of actuator 103 may be fixed to diaphragm 136. In this case, the magnetic circuit of actuator 103 moves relative to the coil, which results in vibrations of diaphragm 136.

Diaphragm 136 is a rectangular board member that is accommodated in cushion body 115. For example, diaphragm 136 is made of wood, resin, or metal.

First cushion section 130 is disposed in front of actuator 103 and diaphragm 136. Second cushion section 140 is disposed behind actuator 103 and diaphragm 136.

Here, first cushion section 130 located in front of actuator 103 includes first three-dimensional net-like elastic body 131 and second covering section 132. However, first three-dimensional net-like elastic body 131 may not be included. A cushion made of a foam member, such as urethane, that includes a through-hole to pass sound from actuator 103 and diaphragm 136 through may be disposed instead. In this way, a material that is high in breathability and in sound transmission may be disposed in front of actuator 103 and diaphragm 136.

Moreover, second cushion section 140 is disposed behind actuator 103 and diaphragm 136. However, this is not intended to be limiting. A supporting member that supports at least one of actuator 103 and diaphragm 136 may be disposed. The supporting member may be a box-like member that covers the back of actuator 103 and diaphragm 136. More specifically, the supporting member may be disposed so that a space between the supporting member and each of actuator 103 and diaphragm 136 functions as an enclosure.

Note that actuator 104 may be provided to seating surface 120 in a manner similar to actuator 103.

Figure 4:
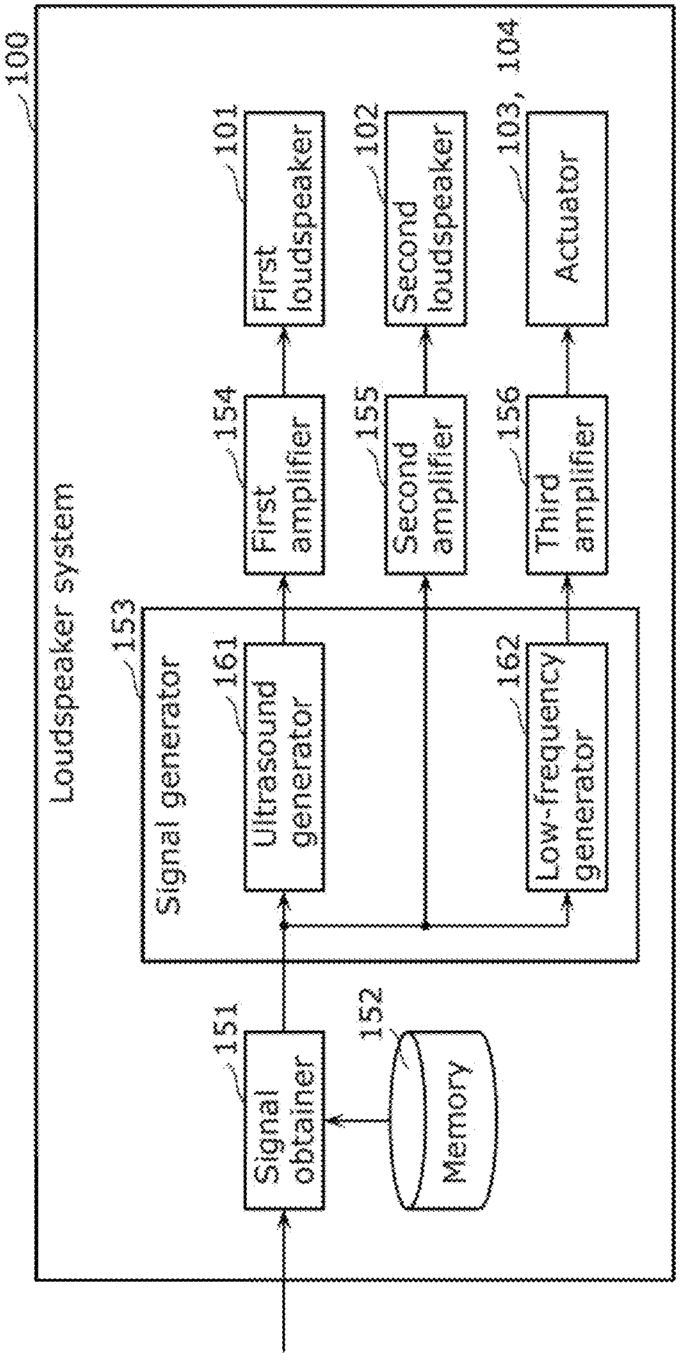
FIG. 4 is a block diagram illustrating a functional configuration of the loudspeaker system.

FIG. 4 is a block diagram illustrating a functional configuration of the loudspeaker system.

Loudspeaker system 100 includes signal obtainer 151, memory 152, signal generator 153, first amplifier 154, second amplifier 155, third amplifier 156, first loudspeaker 101, second loudspeaker 102, and actuators 103 and 104.

Signal obtainer 151 obtains sound source data from memory 152. Signal obtainer 151 may obtain sound source data from an external device.

Memory 152 stores sound source data. If signal obtainer 151 obtains sound source data from the external device, loudspeaker system 100 may not include memory 152. The sound source data may not contain frequency components at 20 kHz and higher. For example, the sound source data may be music data or environmental sound data. For example, the sound source data may be obtained from a music source, such as a CD (Compact Disc). The sound source data recorded on a CD is of 16-bit 2-channel data using a 44.1-kHz sampling frequency. The sound source data may be used for generating a pseudo moving sound corresponding to a moving state of a mobile body. For example, the pseudo moving sound resembles the sound of an engine.

On the basis of the sound source data obtained by signal obtainer 151, signal generator 153 generates an ultrasound signal for ultrasound, an audio signal for sound, and a low-frequency signal for low-frequency vibrations. For the sound source data used for generating a pseudo moving sound, signal generator 153 generates a pseudo moving sound corresponding to a moving state of a mobile body as the sound based on the sound source data. Signal generator 153 includes ultrasound generator 161 and low-frequency generator 162. Signal generator 153 is implemented by a processor and a memory, for example. The memory includes a ROM (Read Only Memory) and a RAM (Random Access Memory), and is capable of storing a program to be executed by the processor. Signal generator 153 is implemented by, for example, the processor that executes the program stored in the memory.

Figure 5:
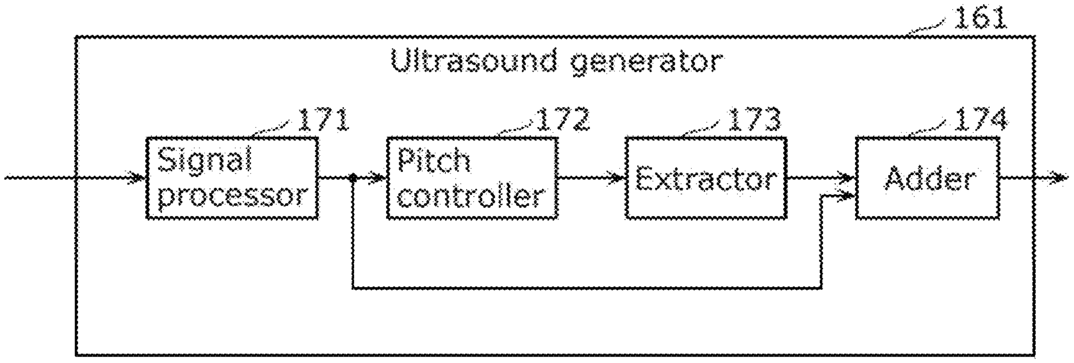
FIG. 5 is a block diagram illustrating an example of a configuration of an ultrasound generator.

FIG. 5 is a block diagram illustrating an example of a configuration of the ultrasound generator.

Ultrasound generator 161 includes signal processor 171, pitch controller 172, extractor 173, and adder 174.

While adder 174 adds frequency components at 20 kHz and higher to the sound source data, signal processor 171 can only add frequency components up to 22.05 kHz when the 44.1-kHz sampling frequency is used. Thus, if the sound source data obtained from a CD, for example, is of 16-bit 2-channel data using the 44.1-kHz sampling frequency, signal processor 171 performs upsampling on the obtained sound source data. As a result, sound source data that is of 24—to 32-bit 2-channel data using a 192-kHz sampling frequency (high-resolution audio, for example) can be generated, for example. Then, frequency components up to 96 kHz can be added to this sound source data. Here, signal processor 171 may directly obtain the high-resolution audio as the sound source data. In this case, signal processor 171 may not perform upsampling.

Pitch controller 172 performs control to multiply a pitch of the sound source data outputted from signal processor 171 by n (where n is a real number greater than 1). The multiplication of the pitch of the sound source data by n causes the overall frequency components of the sound source data to transit to n-times higher frequencies. A value of n is not limited to a particular value. However, the value of n is set such that the sound source data after the pitch control includes frequency components at 20 kHz and higher. For example, pitch controller 172 may obtain a maximum frequency component from the sound source data. Then, if this maximum frequency component is lower than 20 kHz, n may be set to a value that is greater than or equal to a value obtained by dividing 20 kHz by the maximum frequency component. For example, n may be the m-th power of 2 (where m is an integer greater than or equal to 1). More specifically, pitch controller 172 may perform control to cause the pitch of the obtained sound source data to be the m-th power of 2 (two times, four times, eight times, . . . and so on). Here, a level of resultant improvement effect on a physical and mental state may vary depending on the value of m. In view of this, ultrasound generator 161 may include an input receiver that receives information indicating a level of resultant improvement effect on the physical and mental state that the user desires. Then, pitch controller 172 may control the value of m in response to the information received by the input receiver. This enables the user to obtain the user-desired level of improvement effect.

Note that pitch controller 172 may control a sound pressure level in addition to controlling the pitch. In this case, pitch controller 172 may increase or decrease the sound pressure level.

Extractor 173 extracts frequency components at 20 kHz and higher from the sound source data obtained after the pitch control. For example, extractor 173 is a high-pass filter. Extractor 173 is implemented by a digital filter, for instance. However, extractor 173 may be implemented by an analog filter. Extractor 173 may extract frequency components at 40 kHz and higher for example, as the frequency components at 20 kHz and higher included in the sound source data obtained after the pitch control.

Note that extractor 173 may first extract specific frequency components (4 kHz, for example) from the obtained sound source data, and then multiply the extracted frequency components by n (by 10, for example). The frequency components at 20 kHz and higher can also be extracted in this way.

Adder 174 adds the frequency components extracted by extractor 173 to the sound source data outputted by signal processor 171. As a result, the sound source data including the frequency components at 20 kHz and higher can be generated.

Figure 6:
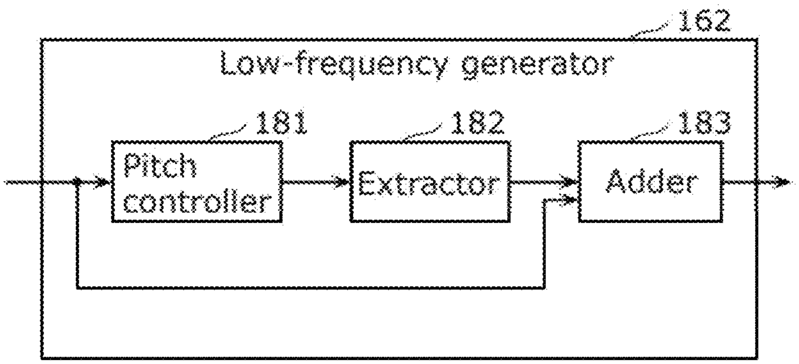
FIG. 6 is a block diagram illustrating an example of a configuration of a low-frequency generator.

FIG. 6 is a block diagram illustrating an example of a configuration of the low-frequency generator.

Low-frequency generator 162 includes pitch controller 181, extractor 182, and adder 183.

Pitch controller 181 performs control to multiply a pitch (a height of sound) of the obtained sound source data by 1/l (where l is a real number greater than 1). The multiplication of the pitch of the sound source data by 1/l causes the overall frequency components of the sound source data to transit to 1/l-times lower frequencies. A value of l is not limited to a particular value. However, the value of I is set such that the sound source data after the pitch control includes frequency components at 90 Hz and lower. For example, pitch controller 181 may obtain a minimum frequency component from the sound source data. Then, if this minimum frequency component is higher than 90 Hz, 1/l may be set to a value that is smaller than or equal to a value obtained by dividing 90 Hz by the minimum frequency component. For example, l may be the k-th power of 2 (where k is an integer greater than or equal to 1). More specifically, pitch controller 181 may perform control to cause the pitch of the obtained sound source data to be $1/k^{th}$-power of 2 (½, ¼, ⅛, . . . and so on). Here, a level of resultant improvement effect on a physical and mental state may vary depending on the value of k. In view of this, low-frequency generator 162 may include an input receiver that receives information indicating a level of resultant improvement effect on the physical and mental state that the user desires. Then, pitch controller 181 may control the value of k in response to the information received by the input receiver. This enables the user to obtain the user-desired level of improvement effect.

Note that pitch controller 181 may control a sound pressure level in addition to controlling the pitch. In this case, pitch controller 181 may increase or decrease the sound pressure level.

Extractor 182 extracts frequency components at 90 Hz and lower from the sound source data obtained after the pitch control. For example, extractor 182 is a low-pass filter. Extractor 182 is implemented by a digital filter, for instance. However, extractor 182 may be implemented by an analog filter. Extractor 182 may extract frequency components at 70 Hz and lower for example, as the frequency component at 90 Hz and lower included in the sound source data obtained after the pitch control.

Note that extractor 182 may first extract specific frequency components (800 Hz, for example) from the obtained sound source data, and then multiply the extracted frequency components by 1/I (by 1/10, for example). The frequency components at 90 Hz and lower can also be extracted in this way.

Adder 183 adds the frequency components extracted by extractor 182 to the obtained sound source data. As a result, the sound source data including the frequency components at 90 Hz and lower can be generated.

Next, a specific example of the sound source data including the frequency components at 20 kHz and higher is described with reference to FIG. 7 to FIG. 9.

Figure 7:
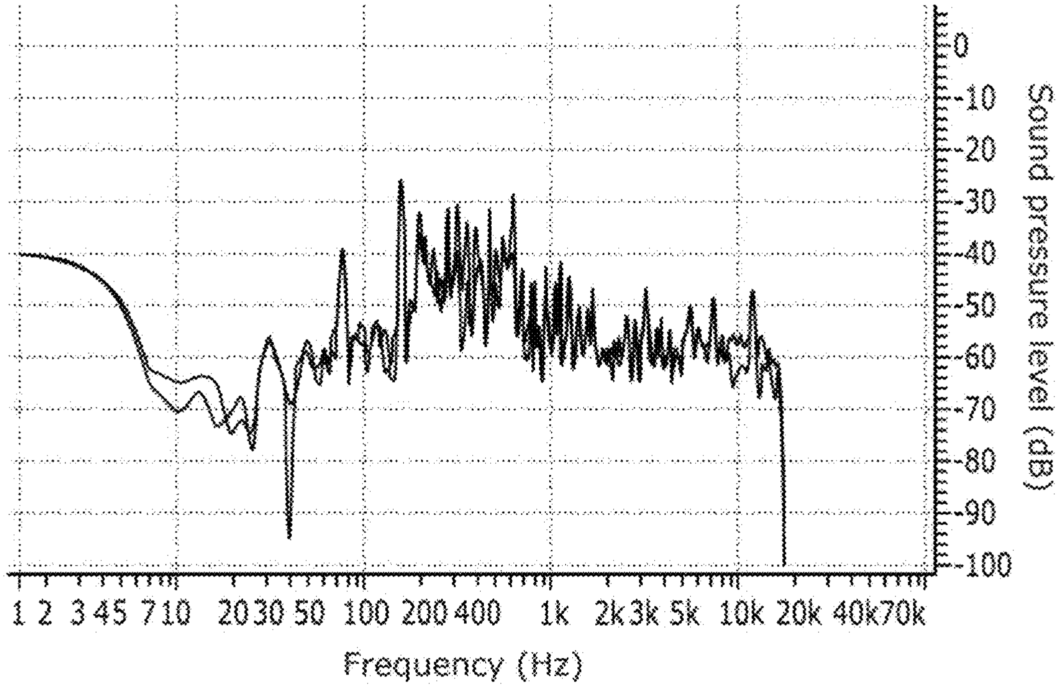
FIG. 7 illustrates an example of sound pressure frequency characteristics of the obtained sound source data.

FIG. 7 illustrates an example of sound pressure frequency characteristics of the obtained sound source data.

Figure 8:
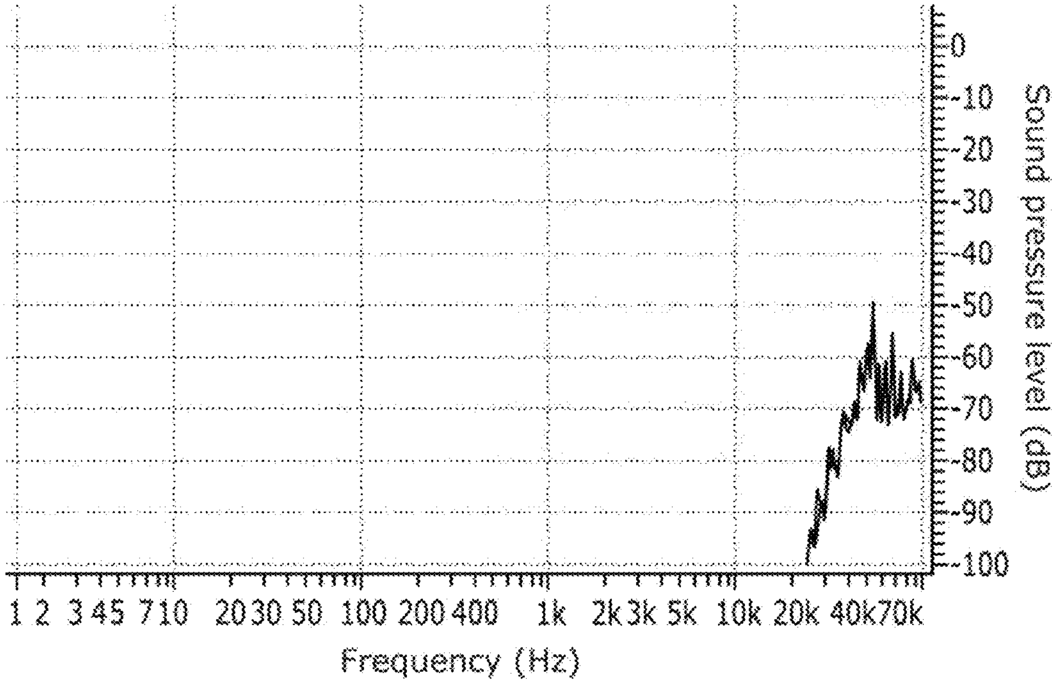
FIG. 8 illustrates an example of the sound pressure frequency characteristics of the extracted frequency components at 20 kHz and higher.

FIG. 8 illustrates an example of the sound pressure frequency characteristics of the extracted frequency components at 20 kHz and higher.

Figure 9:
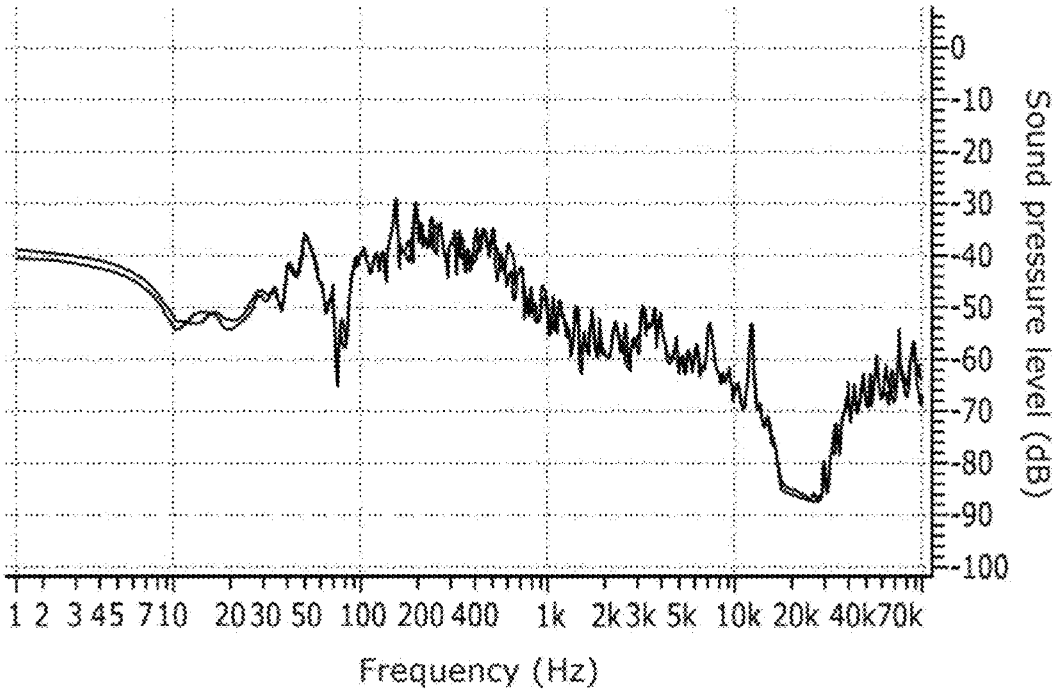
FIG. 9 illustrates an example of the sound pressure frequency characteristics of the sound source data obtained after the addition of the extracted frequency components at 20 kHz and higher.

FIG. 9 illustrates an example of the sound pressure frequency characteristics of the sound source data obtained after the addition of the extracted frequency components at 20 kHz and higher.

Assume that signal processor 171 obtains the sound source data illustrated in FIG. 7, for example. Assume that the obtained sound source data is of 32-bit 2-channel data using a 192 kHz sampling frequency, for example. As can be seen from FIG. 7, the obtained sound source data does not include frequency components at 20 kHz and higher.

Next, pitch controller 172 performs control to multiply the pitch of the obtained sound source data by 10. Then, extractor 173 extracts the frequency components at 20 kHz and higher from the sound source data having the 10-fold pitch obtained through the control. As a result, the frequency components illustrated in FIG. 8 are extracted.

Then, adder 174 adds the extracted frequency components (the frequency components illustrated in FIG. 8) to the obtained sound source data (the sound source data illustrated in FIG. 7). As a result, the sound source data illustrated in FIG. 9 can be generated. As can be seen from FIG. 9, the sound source data including the frequency components at 20 kHz and higher is generated.

In this way, the sound source data including the frequency components at 20 kHz and higher can be generated from the sound source data that does not include the frequency components at 20 kHz and higher.

Next, a specific example of the sound source data including the frequency components at 90 Hz and lower is described with reference to FIG. 10 to FIG. 12.

Figure 10:
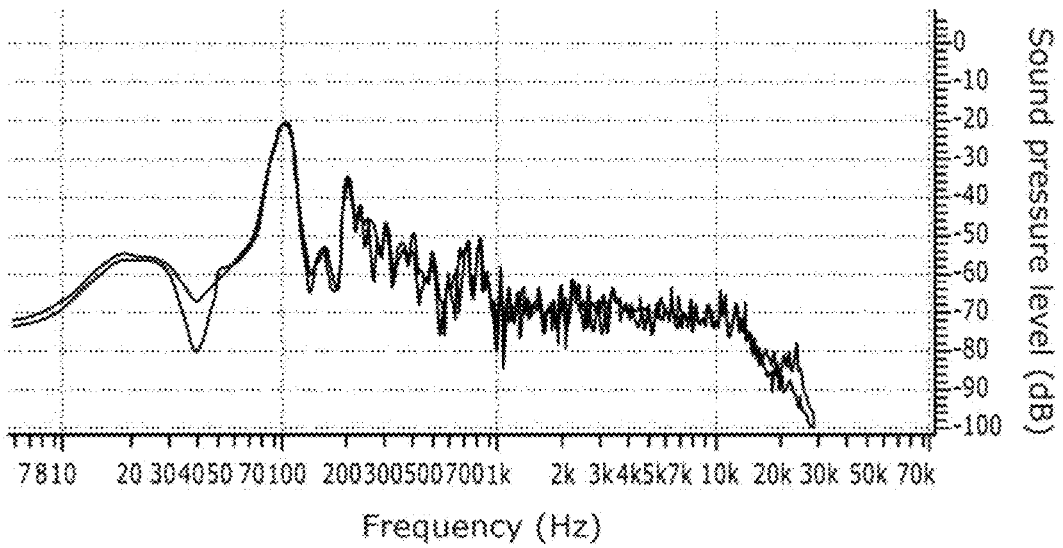
FIG. 10 illustrates an example of the sound pressure frequency characteristics of the obtained sound source data.

FIG. 10 illustrates an example of the sound pressure frequency characteristics of the obtained sound source data.

Figure 11:
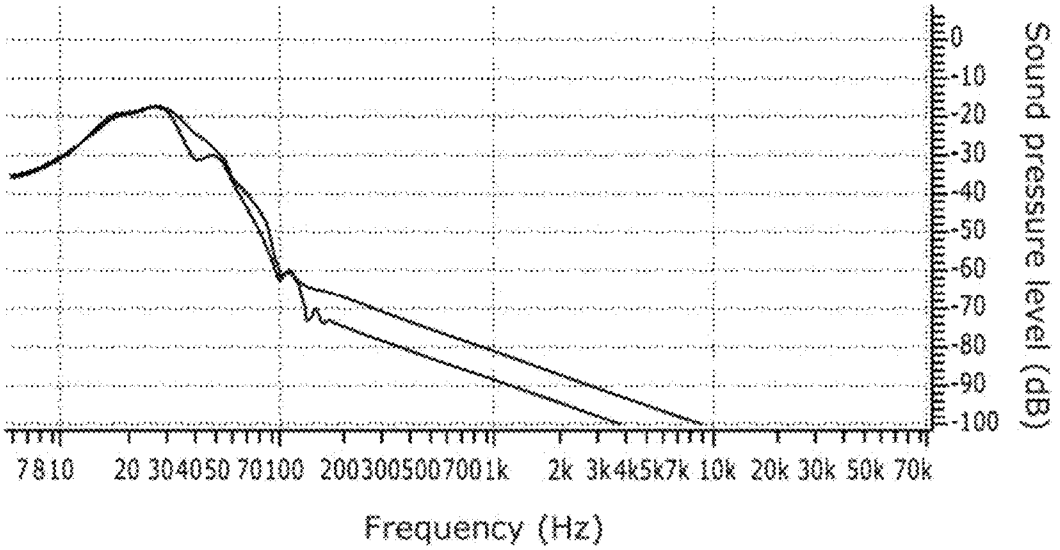
FIG. 11 illustrates an example of the sound pressure frequency characteristics of the extracted frequency components at 90 Hz and lower.

FIG. 11 illustrates an example of the sound pressure frequency characteristics of the extracted frequency components at 90 Hz and lower.

Figure 12:
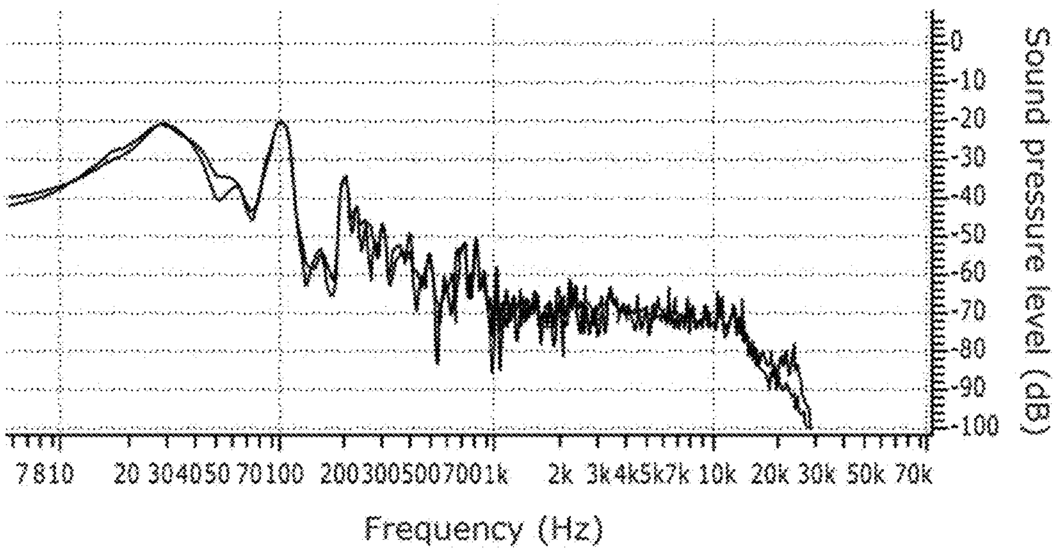
FIG. 12 illustrates an example of the sound pressure frequency characteristics of the sound source data obtained after the addition of the extracted frequency components at 90 Hz and lower.

FIG. 12 illustrates an example of the sound pressure frequency characteristics of the sound source data obtained after the addition of the extracted frequency components at 90 Hz and lower.

Assume that low-frequency generator 162 obtains the sound source data illustrated in FIG. 10, for example. Assume that the obtained sound source data is of 32-bit 2-channel data using a 192 kHz sampling frequency, for example. As can be seen from FIG. 10, the obtained sound source data includes an insufficient sound pressure level of the frequency components at 90 Hz and lower.

Next, pitch controller 181 performs control to multiply the pitch of the obtained sound source data by 1/10. Then, extractor 182 extracts the frequency components at 90 Hz and lower from the sound source data having the 1/10-fold pitch obtained through the control. As a result, the frequency components illustrated in FIG. 11 are extracted.

Then, adder 183 adds the extracted frequency components (the frequency components illustrated in FIG. 11) to the obtained sound source data (the sound source data illustrated in FIG. 10). As a result, the sound source data illustrated in FIG. 12 can be generated. As can be seen from FIG. 12, the sound source data supplemented with the frequency components at 90 Hz and lower is generated.

In this way, the sound source data adjusted to include a sufficient sound pressure level of the frequency components at 90 Hz and lower can be generated from the sound source data including the insufficient sound pressure level of the frequency components at 90 Hz and lower.

First amplifier 154 causes first loudspeaker 101 to output ultrasound based on an ultrasound signal. First amplifier 154 amplifies the ultrasound signal and then outputs the amplified signal to first loudspeaker 101. First loudspeaker 101 thereby outputs the ultrasound.

Second amplifier 155 causes second loudspeaker 102 to output sound based on an audio signal. Second amplifier 155 amplifies the audio signal and then outputs the amplified signal to second loudspeaker 102. Second loudspeaker 102 thereby outputs the sound.

Third amplifier 156 causes actuators 103 and 104 to output sound based on a low-frequency signal. Third amplifier 156 amplifies the low-frequency signal and then outputs the amplified signal to actuators 103 and 104. Actuators 103 and 104 thereby output low-frequency vibrations.

[2. Operation]

Next, an operation performed by loudspeaker system 100 is described.

Figure 13:
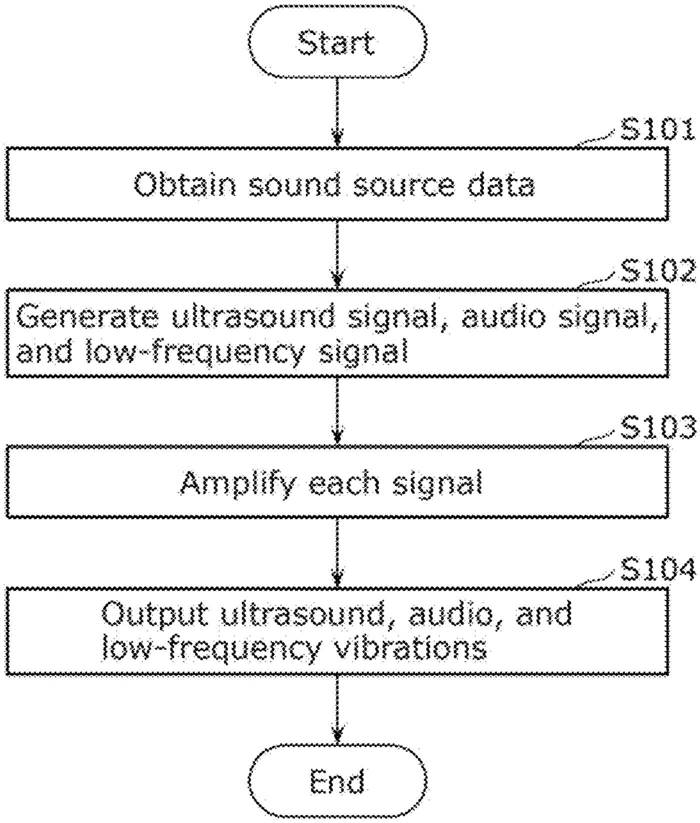
FIG. 13 is a flowchart illustrating an example of an operation performed by the loudspeaker system.

FIG. 13 is a flowchart illustrating an example of the operation performed by the loudspeaker system.

Loudspeaker system 100 obtains sound source data (S101). Step S101 is a process performed by signal obtainer 151. Details of Step S101 are described in the description about signal obtainer 151.

Next, loudspeaker system 100 generates an ultrasound signal for ultrasound, an audio signal for sound, and a low-frequency signal for low-frequency vibrations, on the basis of the sound source data (S102). Step S102 is a process performed by signal generator 153. Details of Step S102 are described in the description about signal generator 153.

Next, loudspeaker system 100 amplifies the ultrasound signal for the ultrasound, the audio signal for the sound, and the low-frequency signal for the low-frequency vibrations (S103), and then outputs the ultrasound, the sound, and the low-frequency vibrations (S104). Step S103 is a process performed by first amplifier 154, second amplifier 155, and third amplifier 156. Details of Step S103 are described in the description about first amplifier 154, second amplifier 155, and third amplifier 156. Step S104 is a process performed by first amplifier 154, second amplifier 155, third amplifier 156, first loudspeaker 101, second loudspeaker 102, and actuators 103 and 104. Details of Step S104 are described in the description about first amplifier 154, second amplifier 155, third amplifier 156, first loudspeaker 101, second loudspeaker 102, and actuators 103 and 104.

3. Experiment

Next, a result of an experiment performed using loudspeaker system 100 is described.

Figure 14:
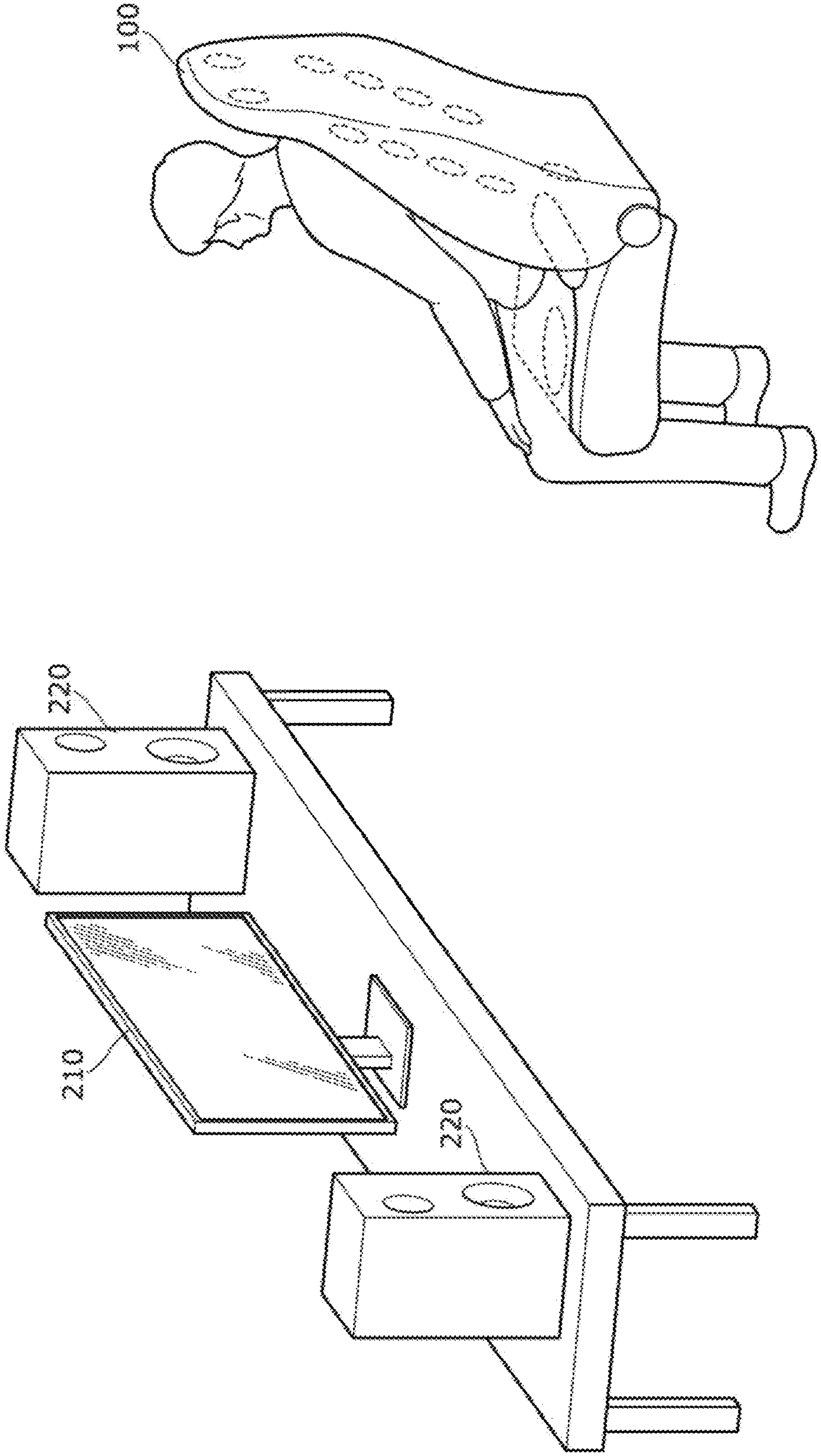
FIG. 14 illustrates an overview of an experiment performed using a sound system that includes the loudspeaker system.

FIG. 14 illustrates an overview of an experiment performed using a sound system that includes the loudspeaker system.

As illustrated in FIG. 14, the experiment was performed using loudspeaker system 100, video display device 210, and loudspeaker 220.

Video display device 210 and loudspeaker 220 are positioned in front of loudspeaker system 100 so as to be opposite to loudspeaker system 100. More specifically, video display device 210 display video to the user seated in loudspeaker system 100, and loudspeaker 220 emits sound to this user. Note that sound source data of sound outputted from loudspeaker 220 is the same as the sound source data of sound outputted from loudspeaker system 100.

In the experiment, specific sound source data was reproduced and then a surface temperature of the face of the user seated in loudspeaker system 100 was thermographically measured for each of conditions. Under condition A, the sound was outputted from both loudspeaker 220 and loudspeaker system 100. Under condition B, the sound was outputted only from loudspeaker 220. In the experiment, the sound source data that was about 4 minutes long was reproduced five times, and the surface temperature of the face of the user was measured up to 20 minutes after the end of the reproduction.

Figure 15:
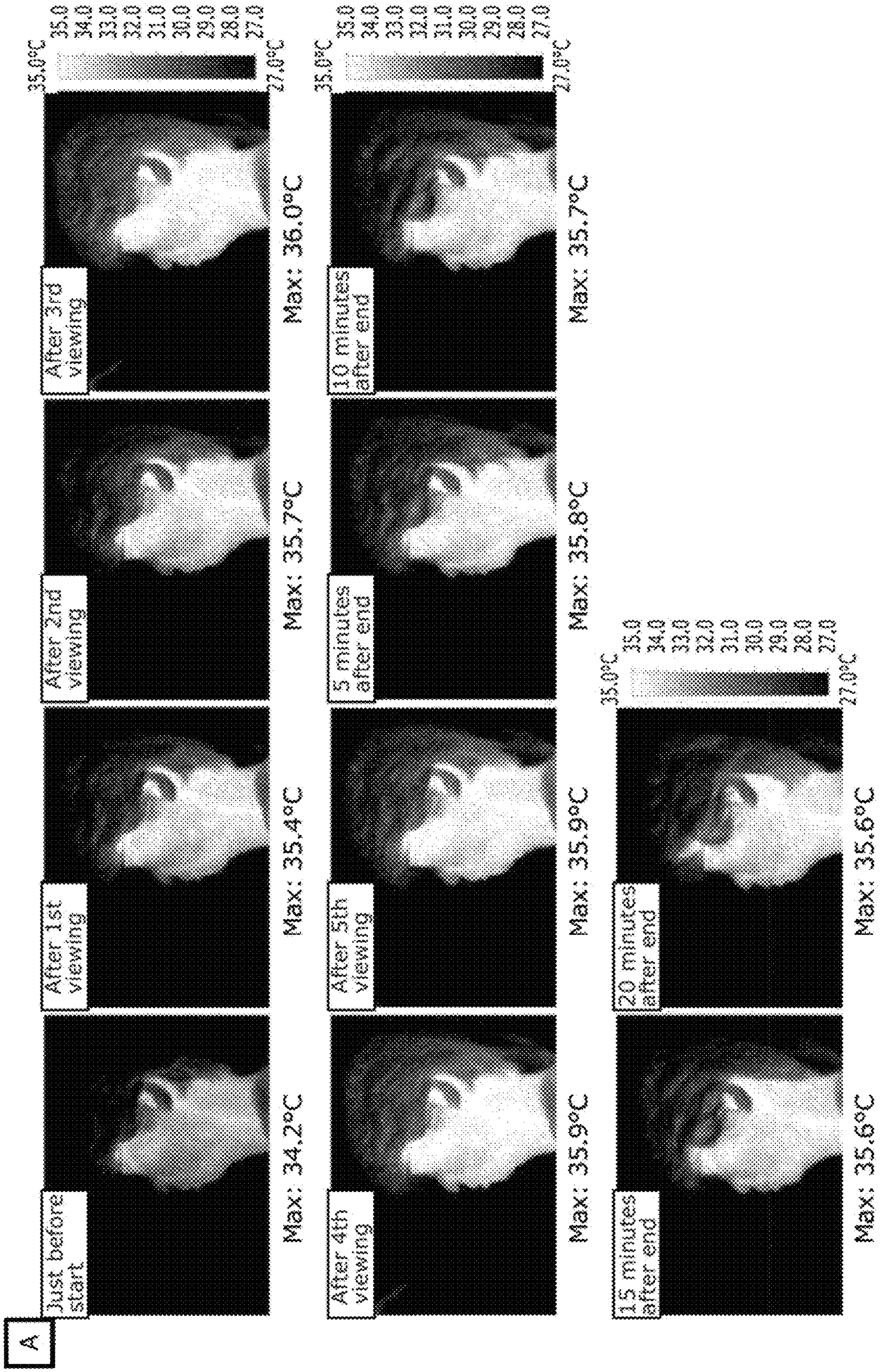
FIG. 15 illustrates a result of the experiment showing change in the surface temperature of the face of a user under condition A.
Figure 16:
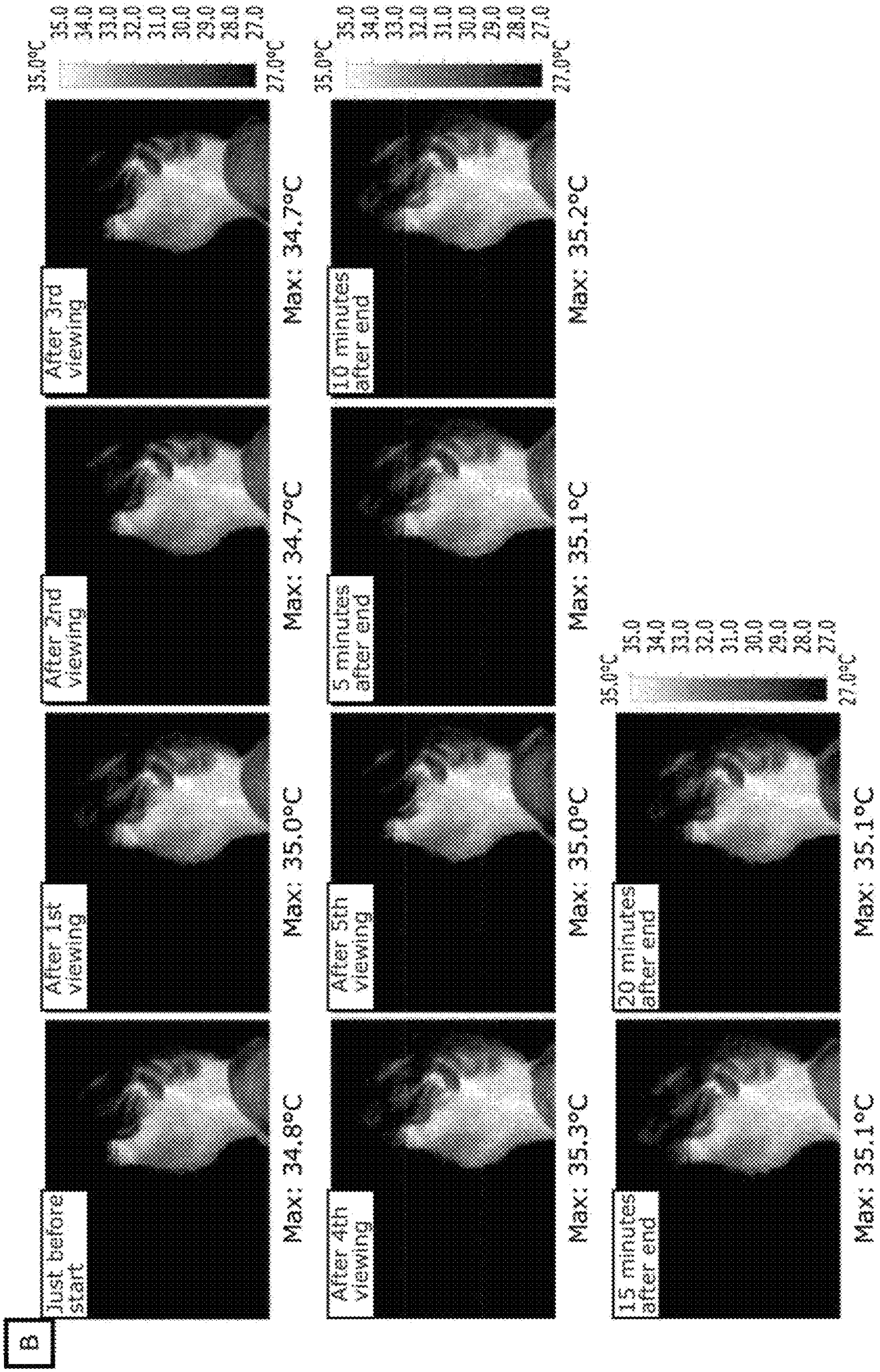
FIG. 16 illustrates a result of the experiment showing change in the surface temperature of the face of the user under condition B.
Figure 17:
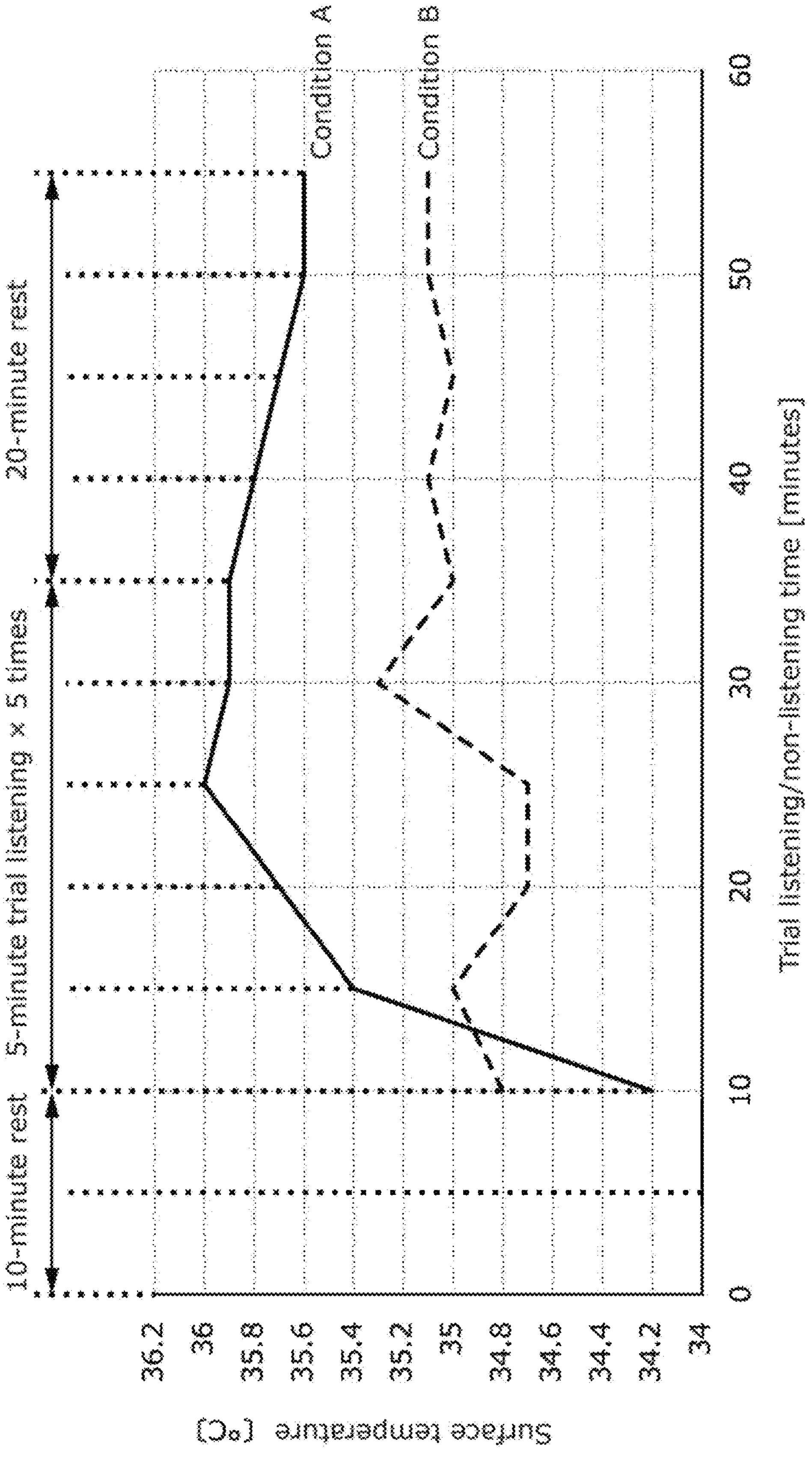
FIG. 17 is a graph showing the result of the experiment performed under the conditions.

FIG. 15 illustrates a result of the experiment showing change in the surface temperature of the face of the user under condition A. FIG. 16 illustrates a result of the experiment showing change in the surface temperature of the face of the user under condition B. FIG. 17 is a graph showing the result of the experiment performed under these conditions.

As can be understood from FIG. 15 to FIG. 17, after the start of trial listening of the sound source data, the surface temperature of the face of the user increases more under condition A. This indicates that a bloodstream of a person can be effectively improved more when the sound source data is listened from loudspeaker 220 and loudspeaker system 100 than when the sound source data is listened from only loudspeaker 220 ahead.

4. Advantageous Effects etc.

Loudspeaker system 100 according to the present embodiment includes: first section 111, as the first cushion body, near which a head of a person is to be located when the person is seated or recumbent; and first loudspeaker 101 that is provided to first section 111 and outputs ultrasound toward the head of the person. This allows the ultrasound to be outputted toward the head of the person and can thereby effectively improve the bloodstream of the person.

For example, loudspeaker system 100 further includes: second section 112, as the second cushion body, that comes in contact with the back of the person when the person is seated or recumbent; and second loudspeaker 102 that is provided to second section 112 and outputs sound toward the back of the person. This further allows the sound to be outputted toward the back of the person and can thereby more effectively improve the bloodstream of the person.

For example, second loudspeaker 102 of loudspeaker system 100 includes the group of loudspeakers that are aligned along the spine of the person. This allows the sound to be outputted along the spine of the person and can thereby more effectively improve the bloodstream of the person.

For example, loudspeaker system 100 further includes: third section 113 and seating surface 120, as the third cushion body, that come in contact with at least one of a waist, a hip, and a thigh of the person when the person is seated or recumbent; and actuators 103 and 104 that are provided to third section 113 and seating surface 120 and output low-frequency vibrations toward at least one of the waist, the hip, and the thigh of the person. This allows the low-frequency vibrations to be outputted toward at least one of the waist, the hip, and the thigh of the person, and can thereby more effectively improve the bloodstream of the person.

For example, loudspeaker system 100 further includes signal generator 153 that generates, on the basis of the sound source data, an ultrasound signal for ultrasound, an audio signal for sound, and a low-frequency signal for low-frequency vibrations. With this, the ultrasound signal for the ultrasound, the audio signal for the sound, and the low-frequency signal for the low-frequency vibrations are generated from the same sound source data. Thus, characteristics, such as high/low levels, of the ultrasound, the sound, and the low-frequency vibrations can match with each other. This thereby enables emission of the ultrasound, the sound, and the low-frequency vibrations that comfort the person.

For example, loudspeaker system 100 further includes: first amplifier 154 that causes first loudspeaker 101 to output ultrasound based on an ultrasound signal; second amplifier 155 that causes second loudspeaker 102 to output sound based on an audio signal; and third amplifier 156 that causes actuators 103 and 104 to output low-frequency vibrations based on a low-frequency signal. With this, the ultrasound signal for the ultrasound, the audio signal for the sound, and the low-frequency signal for the low-frequency vibrations obtained from the same sound source data are outputted to the first loudspeaker, the second loudspeaker, and the actuators, respectively. Thus, the ultrasound, the sound, and the low-frequency vibrations having similar characteristics can be outputted. This thereby enables emission of the ultrasound, the sound, and the low-frequency vibrations that comfort the person.

For example, signal generator 153 generates a pseudo moving sound corresponding to a moving state of a mobile body as the sound based on the sound source data. This output of the pseudo moving sound can effectively improve a bloodstream of a person who is riding in the mobile body.

[5. Variations]

(1)

Loudspeaker system 100 according to the embodiment described above includes first loudspeaker 101, second loudspeaker 102 and actuators 103 and 104. However, the configuration may only have to include at least first loudspeaker 101 and first section 111. More specifically, loudspeaker system 100 may include a seat that includes only first loudspeaker 101, may include a seat that includes first loudspeaker 101 and second loudspeaker 102, or may include a seat that includes first loudspeaker 101 and actuator 103. In this way, loudspeaker system 100 may include a combination of first loudspeaker 101 and at least one of second loudspeaker 102 and actuators 103 and 104.

(2)

Loudspeaker system 100 may be mounted into automobile 300 that is a mobile body.

Figure 18:
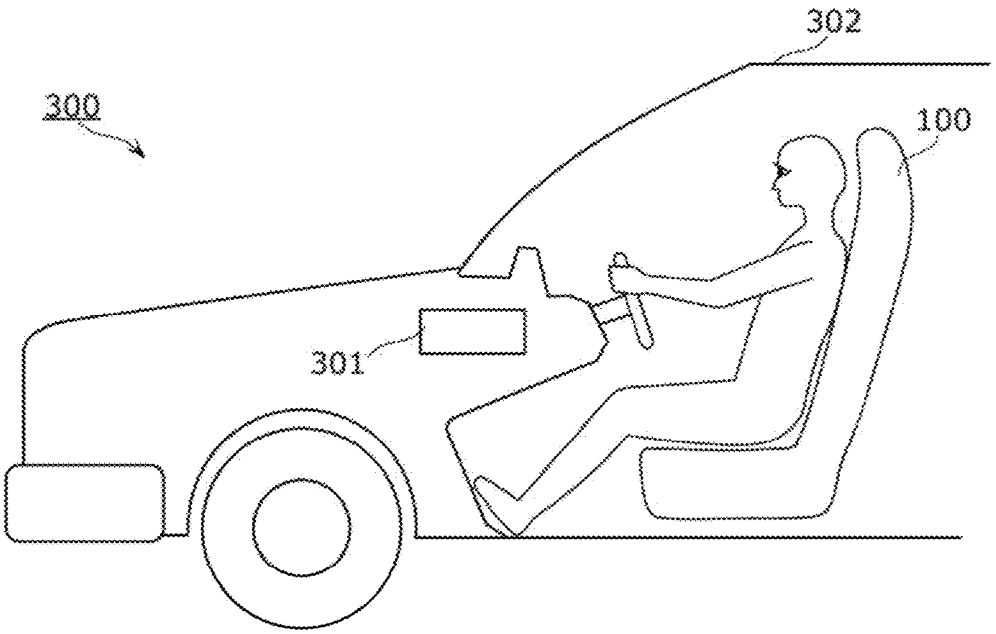
FIG. 18 is a cross-section view of an automobile that is a mobile body according to a variation.

Next, an example of the mobile body including loudspeaker system 100 is described with reference to FIG. 18. FIG. 18 is a cross-section view of the automobile that is the mobile body according to a variation.

Automobile 300 includes loudspeaker system 100 that is a seat. A car navigation system and a car audio system are included in circuit 301 that inputs an electrical signal to a loudspeaker. More specifically, automobile 300, which is the mobile body, includes: loudspeaker system 100; circuit 301 that inputs an electrical signal to loudspeaker system 100; and main body 302 that is self-propelled and includes loudspeaker system 100 and circuit 301.

(3)

Although loudspeaker system 100 is the seat in the embodiment described above, this is not intended to be limiting. For example, loudspeaker system 109 may be adopted into a bed that includes a cushion body that comes into contact with a person when the person is recumbent Each of the elements of signal generator 153 in loudspeaker system 100 in each of the above embodiments may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory.

Although loudspeaker system 100 according to one or more aspects of the present disclosure has been described based on an embodiment, the present disclosure is not limited to this embodiment. Those skilled in the art will readily appreciate that embodiments arrived at by making various modifications to the above embodiment or embodiments arrived at by selectively combining elements disclosed in the above embodiment without materially departing from the scope of the present disclosure may be included within one or more aspects of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings and claims are incorporated herein by reference in its entirety: Japanese Patent Application No. 2021-125793 filed on Jul. 30, 2021.

INDUSTRIAL APPLICABILITY

The present disclosure is useful as, for example, a loudspeaker system that is capable of effectively improving a bloodstream of a person.

The invention claimed is:

1. A loudspeaker system comprising:

a signal obtainer program that obtains a sound source data;

a first cushion body near which a head of a person is located when the person is seated or recumbent;

a first loudspeaker associated with the first cushion body and outputs ultrasound toward the head;

a second cushion body near which a back of the person is located when the person is seated or recumbent;

a second loudspeaker associated with the second cushion body and outputs low frequency sound toward the back; and an ultrasound generator program that generates the ultrasound based on the sound source data for the output at the first loudspeaker, wherein the ultrasound generator program generates the ultrasound by multiplying a pitch of the sound source data by a real number greater than one to generate a frequency of at least 20 kHz in the ultrasound.

2. The loudspeaker system according to claim 1, wherein the second loudspeaker includes a group of loudspeakers that are aligned along a spine of the person.

3. The loudspeaker system according to claim 1, further comprising:

a third cushion body that comes in contact with at least one of a waist, a hip, and a thigh of the person when the person is seated or recumbent; and an actuator associated with the third cushion body and outputs low-frequency vibrations toward the at least one of the waist, the hip, and the thigh.

4. The loudspeaker system according to claim 3, wherein the first loudspeaker associated with the first cushion body, the second loudspeaker associated with the second cushion body, and the actuator associated with the third cushion body are connected together resulting in a mobile body chair configuration.

5. The loudspeaker system according to claim 1, further comprising:

a third cushion body that comes in contact with at least one of a waist, a hip, and a thigh of the person when the person is seated or recumbent;

an actuator that is provided to the third cushion body and outputs low-frequency vibrations toward the at least one of the waist, the hip, and the thigh; and a signal generator that generates an ultrasound signal for the ultrasound, an audio signal for the sound, and a low-frequency signal for the low-frequency vibrations, on the basis of sound source data.

6. The loudspeaker system according to claim 5, further comprising:

a first amplifier that causes the first loudspeaker to output the ultrasound based on the ultrasound signal;

a second amplifier that causes the second loudspeaker to output the sound based on the audio signal; and a third amplifier that causes the actuator to output the low-frequency vibrations based on the low-frequency signal.

7. The loudspeaker system according to claim 5, wherein the signal generator generates a pseudo moving sound corresponding to a moving state of a mobile body as the sound based on the sound source data.

8. A mobile body seat comprising the loudspeaker system according to claim 1.

9. A mobile body comprising the mobile body seat according to claim 8.

10. The loudspeaker system according to claim 1, wherein when a maximum frequency in the sound source data is lower than 20 kHz, the real number is set to a value that is greater than or equal to the value obtained by dividing 20 kHz by the maximum frequency.

11. The loudspeaker system according to claim 1, wherein the real number is an $m^{th}$ power of 2.

12. The loudspeaker system according to claim 1, wherein the ultrasound generator program generates the ultrasound based on specific frequency data components multiplying the pitch of a specific frequency in the sound source data by the real number.

13. The loudspeaker system according to claim 12, wherein the ultrasound generator program generates the ultrasound by adding the sound source data to the specific frequency data components by multiplying the pitch of the specific frequency by the real number.

* * * * *